United States Patent Office 3,549,709
Patented Dec. 22, 1970

3,549,709
PROCESS FOR THE PREPARATION OF PHENOLS
René Victor Julien Achard, and Noel Crenne, Lyon, Rhone, France, assignors to Rhone-Poulenc S.A., Paris, France, a French body corporate
No Drawing. Filed June 27, 1966, Ser. No. 560,824
Claims priority, application France, June 30, 1965, 22,941
Int. Cl. C07c 37/00, 43/20
U.S. Cl. 260—612                              2 Claims

ABSTRACT OF THE DISCLOSURE

Phenols are made by oxidizing aromatic compounds with hydrogen peroxide in the presence of boric acid, boric anhydride, or a borate ester, and hydrolyzing the product.

---

The present invention relates to a process for the preparation of a phenol by introducing a phenol group into an aromatic compound.

It is known that aromatic hydrocarbons may be converted into phenols using hydrogen peroxide, in an inert and initially anhydrous medium, the process being carried out in the presence of small amounts of metallic oxides which are capable of forming unstable peracids (rather than peroxides), such as $OsO_4$, $RuO_4$, $V_2O_5$ and $CrO_3$ (see for example United States Patent specification No. 2,395,638). It is known that under these conditions benzene may be converted into phenol in yields from 22 to 30% and that toluene may be converted into cresols in 30% yield.

It has now been found that it is also possible to produce phenols from aromatic hydrocarbons by reaction with hydrogen peroxide, if the process is carried out in the presence of boric anhydride or a boric derivative which can form esters, for example metaboric acid or an alkyl orthoborate, preferably a lower alkyl (1 to 4 carbon atoms) borate. The phenols so produced are at least partially present as the corresponding borate esters. In order to isolate all the phenols themselves it is sufficient to carry out a hydrolysis to complete the process. Thus the present invention provides a process for the preparation of phenolic compounds which comprises reacting an aromatic compound containing at least one nuclear hydrogen atom with anhydrous hydrogen peroxide in the presence of boric acid, boric anhydride or a borate ester and subsequently hydrolysing the product to liberate the phenolic compound.

The process of the invention can be applied to any aromatic compound having at least one nuclear hydrogen atom and not containing substituents which can interfere with the formation of the phenolic OH group. It may be applied either to unsubstituted monocyclic or polycyclic aromatic hydrocarbons, for example benzene, toluene, xylene, diphenyl or naphthalene or to monocyclic or polycyclic aromatic compounds having either nuclear or sidechain substituents or both, which do not interfere with the formation of the phenolic OH group, for example halogen atoms, particularly chlorine atoms, ether groups or hydroxyl groups which are protected as borate esters. The following are especially suitable aromatic compounds: mono- and dihalobenzenes, mono- and di-alkylbenzenes, mono- and di-alkoxybenzenes, aryloxybenzenes and the alkyl orthoborate esters of the mono-hydroxy phenol derivatives of these compounds, e.g. monochlorobenzene, p-dichlorobenzene, anisole, phenetole, diphenyl ether, dimethoxybenzenes, o-chloroanisole, p-chloroanisole and borate esters of phenol and the cresols. The aforesaid alkyl and alkoxy groups preferably contain up to 4 carbon atoms.

The hydrogen peroxide used should be as anhydrous as possible and may be employed as a solution in a nonoxidisable organic solvent. Such solutions are easily obtained by extracting the hydrogen peroxide from a concentrated aqueous solution with organic solvents (for example aliphatic ethers, methyl acetate or ethyl acetate) and, for example, working up as described in United States Patent specification No. 2,395,638. The concentration of the solution so obtained is generally very low, especially as the commercial hydrogen peroxide solution from which hydrogen peroxide is extracted is itself dilute. When extracting from 130 volumes hydrogen peroxide, organic solutions containing 2 to 5% of hydrogen peroxide are obtained. The extraction is preferably carried out with an organic solvent which distils at a temperature below that at which the aromatic compound to be treated distils. Then this auxiliary solvent can be easily removed after adding the hydrogen peroxide solution to the aromatic compound.

An equimolar amount of hydrogen peroxide can be added to the aromatic compound to be treated. Preferably, however a large molar excess of the latter (e.g. 10–100 moles per mole of hydrogen peroxide) is used; this excess, which serves as a diluent, may subsequently be removed from the reaction mass by distillation and recycled.

An amount of boric derivative at least equivalent to the amount of hydrogen peroxide is generally used. In the case of boric anhydride, for example, it is generally advisable to use at least 1 mole, generally from 1.2 to 3.0 mole, of this anhydride or an equivalent amount of another boric compound per mole of $H_2O_2$ employed.

In practice, the process is preferably carried out as follows: the aromatic compound is charged into the apparatus, the organic solution of hydrogen peroxide is added and the auxiliary solvent is removed by distillation, under reduced pressure where possible. The boric derivative is then added and the mixture heated generally between 50 and 150° C. until no reactive oxygen can be detected; ordinarily the time taken is ½ to 5 hours. When the reaction is complete, water is added and the mixture is again heated to decompose the borate ester groups present. The hydrolysis is generally complete in less than an hour at, say 50° to 100° C. The boric acid formed by hydrolysis crystallises out on cooling. It is filtered off and the filtrate is treated by the usual methods to separate the phenolic compound produced.

The following Examples illustrate the invention.

EXAMPLE 1

320 g. of anisole and 2 g. of pure hydrogen peroxide as a solution in 86 g. of diethyl ether were introduced into a 500 cc. three-necked flask equipped with a central stirrer and a distillation column and connected to a water pump. The stirrer was started and the ether was driven off under a progressively decreasing pressure until an absolute pressure of 40 mm. of mercury was reached. 7.7 g. of boric anhydride were then added and the mixture heated to 100° C., this temperature being maintained for one hour. After cooling, it was found that the reactive oxygen had disappeared. 50 cc. of water were then added and the mixture heated for 30 minutes at about 70° C. After cooling, the precipitated boric acid was filtered off. The filtrate was then decanted and the aqueous layer extracted 3 times with 50 cc. of diethyl ether. These ethereal layers were combined with the decanted organic layer. The phenols were extracted from the ethereal solution so obtained by washing 5 times with 40 cc. of a 10% aqueous sodium hydroxide solution. 175 cc. of commercial hydrochloric acid diluted 1:1 with water were then added. The acid solution so obtained was extracted with diethyl ether and the ether layer washed with sodium bicarbonate, dried over sodium sulphate and evaporated in vacuo. 5.39 g. of a mixture of ortho and para methoxyphenols, in the ratio of 1.5:1 were thus obtained. Yield=79% based on the hydrogen peroxide employed.

EXAMPLES 2 TO 7

A series of experiments were carried out as in Example 1, the details being summarised in the table below. The amount of hydrogen peroxide was 2 g. in all cases.

TABLE 1

| Example No.: | Aromatic compound | Boric derivative | Time and temperature (° C.) of reaction | Yield of phenols based on the hydrogen peroxide employed |
|---|---|---|---|---|
| 2 | Anisole, 320 cc | Metaboric acid, 9.7 g | 1½ hrs. at 100° | Methoxyphenols, 64.5%. |
| 3 | Anisole, 320 cc | Methyl borate, 100 cc | 4½ hrs. at 110–115° | Methoxyphenols, 81%. |
| 4 | Phenetole, 300 cc | Boric anhydride, 8 g | 1½ hrs. at 70° | Ethoxyphenols, 63.5%. |
| 5 | 1,3-dimethoxybenzene, 320 cc | Boric anhydride, 8.2 g | 1½ hrs. at 100° | Dimethoxyphenols, 89%. |
| 6 | Toluene, 320 cc | Boric anhydride, 7.7 g | 2 hrs. at 90–100° | o- and p-cresols, 47.5%. |
| 7 | m-xylene, 150 cc | Boric anhydride, 4.3 g | 2 hrs. at 110° | Xylenols, 46%. |

EXAMPLE 8

300 cc. of phenetole and 100 cc. of ethyl acetate containing 2.35 g. of hydrogen peroxide were charged into the apparatus described in Example 1. The ethyl acetate was then driven off by heating to 30–35° C. under reduced pressure (40 mm. of mercury). 8 g. of boric anhydride were then added and the mixture heated for 1½ hrs. at 70° C. The reaction mixture was then treated as in Example 1 to give 4.9 g. of a mixture of ethoxyphenols. Yield=56.5% based on the hydrogen peroxide employed.

We claim:

1. Process for the preparation of a mono- or di-(alkyl)- or mono- or di-(alkoxy)-phenol in which the alkyl and alkoxy groups contain from 1–4 carbon atoms, which comprises contacting 10 to 100 molecular proportions of a mono- or di-(alkyl)- or mono- or di-(alkoxy)-benzene in which the alkyl and alkoxy groups contain from 1–4 carbon atoms, at between 50° and 150° C. with one molecular proportion of anhydrous hydrogen peroxide in the presence of 1.2 to 3.0 molecular proportions of boric anhydride, or an equivalent amount of metaboric acid or a lower alkyl orthoborate in which the alkyl group contains from 1–4 carbon atoms, subsequently hydrolising the reaction product to liberate the phenol, and isolating the latter.

2. Process according to claim 1, in which the hydrogen peroxide is employed as a solution in diethyl ether or methyl or ethyl acetate.

References Cited

UNITED STATES PATENTS

| 2,437,648 | 3/1948 | Milas | 260—621G |
| 3,377,386 | 4/1968 | Chafetz | 260—621 |

FOREIGN PATENTS

| 6413524 | 5/1965 | Netherlands | 260—621G |

LEON ZITVER, Primary Examiner

N. P. MORGENSTERN, Assistant Examiner

U.S. Cl. X.R.

260—621, 623, 624